United States Patent
Richardson et al.

(10) Patent No.: US 12,430,303 B2
(45) Date of Patent: Sep. 30, 2025

(54) SYSTEMS AND METHODS FOR DETECTING AND REPAIRING DATA ERRORS USING ARTIFICIAL INTELLIGENCE

(71) Applicant: MCKINSEY & COMPANY, INC., New York, NY (US)

(72) Inventors: Bryan Richardson, Vancouver (CA); Kayvaun Rowshankish, New York, NY (US); Pedro Jose Silva Briceño, Bicester (GB)

(73) Assignee: MCKINSEY & COMPANY, INC., New York, NY (US)

( * ) Notice: Subject to any disclaimer, the term of this patent is extended or adjusted under 35 U.S.C. 154(b) by 58 days.

(21) Appl. No.: 17/570,372

(22) Filed: Jan. 6, 2022

(65) Prior Publication Data
US 2023/0214369 A1  Jul. 6, 2023

(51) Int. Cl.
*G06F 16/215* (2019.01)
*G06F 18/21* (2023.01)
*G06F 40/30* (2020.01)
*G06F 40/40* (2020.01)
*G06N 20/20* (2019.01)

(52) U.S. Cl.
CPC ........ *G06F 16/215* (2019.01); *G06F 18/2178* (2023.01); *G06F 40/30* (2020.01); *G06F 40/40* (2020.01); *G06N 20/20* (2019.01)

(58) Field of Classification Search
CPC .................................................. G06F 18/2178
See application file for complete search history.

(56) References Cited

U.S. PATENT DOCUMENTS

| | | | |
|---|---|---|---|
| 2021/0191957 A1* | 6/2021 | Swamy | G06N 20/00 |
| 2021/0200745 A1* | 7/2021 | Bui | G06F 18/214 |
| 2021/0209177 A1* | 7/2021 | Abdunabi | G06F 9/547 |
| 2021/0224704 A1* | 7/2021 | Waldo, IV | G06Q 10/0637 |
| 2022/0083370 A1* | 3/2022 | Barker, Jr. | G06F 9/45558 |
| 2022/0342867 A1* | 10/2022 | Haslbeck | G06N 20/20 |
| 2023/0195715 A1* | 6/2023 | Schleith | G06F 18/24 707/691 |

* cited by examiner

*Primary Examiner* — Grace Park
(74) *Attorney, Agent, or Firm* — MARSHALL, GERSTEIN & BORUN LLP; Randall G. Rueth

(57) ABSTRACT

The following relates generally to detecting and repairing data errors using artificial intelligence (AI). In some embodiments, one or more first processors execute an AI toolkit comprising a plurality of units. The plurality of units may include, for example, a connect unit, an integrate unit, a detect unit, a correct unit, a repair unit, and/or a visualize unit. The AI toolkit may then be deployed to one or more second processors. The one or more second processors may then further execute the AI toolkit and/or run/augment the AI toolkit to detect and/or repair errors in data.

21 Claims, 8 Drawing Sheets

500

| Classification of confidence level |  |
|---|---|
| 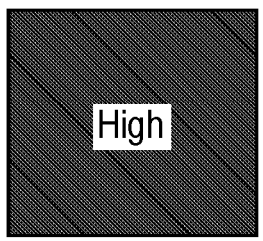 High | • Consensus with >75% majority,<br>• High confidence automated correction (procedural or lookup), OR<br>• Recommendation of NLP model has high confidence distance (<0.3) |
| 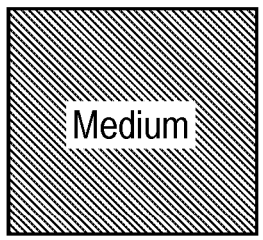 Medium | • Consensus with >60% and <75% majority,<br>• Medium confidence automated correction (procedural or lookup), OR<br>• Recommendation of NLP model has medium confidence distance (>0.3 and <0.5) |
| 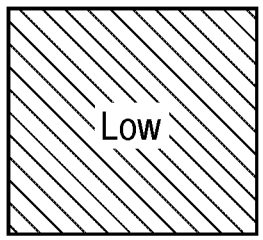 Low | • Consensus with >50% and <60% majority, OR<br>• Recommendation of NLP model has low confidence distance (>0.5) |

FIG. 5

SYSTEMS AND METHODS FOR DETECTING AND REPAIRING DATA ERRORS USING ARTIFICIAL INTELLIGENCE

FIELD

The present disclosure generally relates to improving data quality, and more particularly relates to using artificial intelligence (AI) to detect and correct errors in data.

BACKGROUND

Many companies hold vast amounts of data. For example, companies may store data of their clients (e.g., a doctor's office stores phone numbers), or data of their products (e.g., product dimensions/measurements, etc.), etc. However, as is known, company data often has errors. For instance, in the data, client phone numbers may be outdated, customer data could be wrong, or a product's dimensions may be incorrect, etc. Yet, no efficient solution currently exists for detecting and/or correcting these errors.

The systems and methods disclosed herein provide solutions to these problems and others.

SUMMARY

The following relates generally to detecting and repairing data errors using artificial intelligence (AI). The system may be designed to automate the workflow related to detection, correction, and repair of data quality issues using AI and external data through a human-in-the-loop process. This invention is extendable and modular in nature in some aspects, enabling new units to be added to the system to correct new types of errors. It may have a user interface that allows users to provide feedback to the system to improve performance.

In one aspect, a computer system for use in improving data quality may be provided. The computer system may comprise one or more first processors configured to: (1) execute a plurality of units, the plurality of units comprising: (a) a connect unit configured to receive, through one or more second processors, data from one or more data sources; (b) an integrate unit configured to: (i) receive the data from the connect unit, (ii) prepare the data for analysis by integrating the data; and (c) a detect unit configured to: (i) receive the integrated data from the integrate unit, and (ii) detect anomalies in the integrated data; and (2) deploy, from the one or more first processors to the one or more second processors, the executed plurality of units.

In another aspect, there is a computer-implemented method for use in improving data quality, the method comprising: (1) receiving, with one or more second processors from one or more first processors, a plurality of units, the plurality of units comprising a connect unit, an integrate unit, and a detect unit; (2) with the received connect unit and at the one or more second processors, receiving data from one or more data sources; (3) with the received integrate unit and at the one or more second processors: (i) receiving the data from the connect unit, (ii) preparing the data for analysis by integrating the data; and (4) with the detect unit and at the one or more second processors: (i) receiving the integrated data from the integrate unit, and (ii) detecting anomalies in the integrated data.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 5 illustrates an example of determining a confidence level based on consensus, and classifying the determined confidence level.

DETAILED DESCRIPTION

The present embodiments relate to, inter alia, using AI to detect and/or repair errors in data. For example, in some embodiments, an AI toolkit (e.g., a plurality of units) is executed at one or more first processors, and then deployed to one or more second processors; the one or more second processors may further execute the AI toolkit, and/or use the AI toolkit to detect and/or repair errors in data.

Example System

Figure 1:
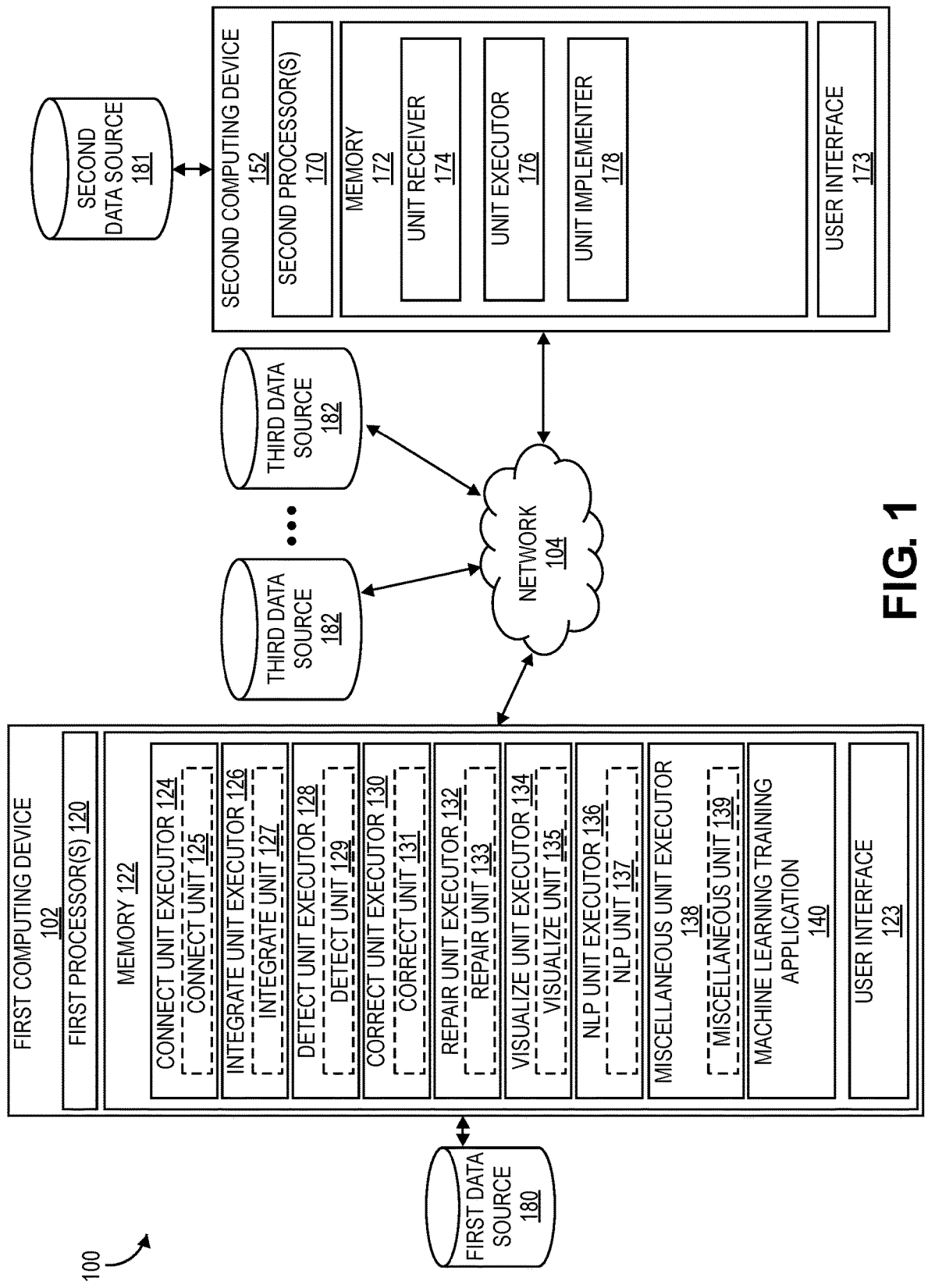
FIG. 1 illustrates an example system for improving data quality.

FIG. 1 shows an example system 100 for improving data quality. The high-level architecture illustrated in FIG. 1 may include both hardware and software applications, as well as various data communications channels for communicating data between the various hardware and software components, as is described below. The system may include a first computing device 102 configured to communicate (e.g., via a network 104, which may be a wired or wireless network, such as the internet), with a second computing device 152, and/or first data source 181.

The first computing device 102 may include one or more first processors 120 such as one or more microprocessors, controllers, and/or any other suitable type of processor. The first computing device 102 may further include a memory 122 (e.g., volatile memory, non-volatile memory) accessible by the one or more first processors 120 (e.g., via a memory controller). Additionally, the first computing device 102 may include a user interface 123.

The one or more first processors 120 may interact with the memory 122 to obtain, for example, computer-readable instructions stored in the memory 122. Additionally or alternatively, computer-readable instructions may be stored on one or more removable media (e.g., a compact disc, a digital versatile disc, removable flash memory, etc.) that may be coupled to the first computing device 102 to provide access to the computer-readable instructions stored thereon. In particular, the computer-readable instructions stored on the memory 122 may include instructions for executing various applications, such as a connect unit executor 124, an integrate unit executor 126, a detect unit executor 128, a correct unit executor 130, a repair unit executor 132, a visualize unit executor 134, a natural language processing (NLP) executor 136, a miscellaneous unit executor 138, and/or a machine learning training application 140. The first computing device 102 may further be in communication with a first data source 180 for storing/retrieving any kind of information. Furthermore, it should be understood that although the example of FIG. 1 illustrates only one data source 180 connected to the first computing device 102, any number of data sources may be connected to the first computing device 102.

The first computing device 102 may comprise any suitable device. For example, the first computing device 102 may comprise server(s), personal computer(s), a smartphone, a tablet, a phablet, etc. In some embodiments, the first computing device 102 builds a plurality of units (e.g., modules) for deployment to the second computing device 152. The plurality of units may include, for example, a connect unit 125 (executed, e.g., by the connect unit executor 124), an integrate unit 127 (executed, e.g., by the integrate unit executor 126), a detect unit 129 (executed, e.g., by the detect unit executor 128), a correct unit 131 (executed, e.g., by the correct unit executor 130), a repair unit 133 (executed, e.g., by the repair unit executor 132), a visualize unit 135 (executed, e.g., by the visualize unit executor 134), a NLP unit 137 (executed, e.g., by the NLP unit executor 136, and/or any other kind of unit (such as a miscellaneous unit 139 executed, e.g., by the miscellaneous unit executor 138).

The second computing device 152 may include one or more second processors 170 such as one or more microprocessors, controllers, and/or any other suitable type of processor. The second computing device 152 may further include a memory 152 (e.g., volatile memory, non-volatile memory) accessible by the one or more second processors 170 (e.g., via a memory controller). Additionally, the computing device may include a user interface 173.

The one or more second processors 170 may interact with the memory 172 to obtain, for example, computer-readable instructions stored in the memory 172. Additionally or alternatively, computer-readable instructions may be stored on one or more removable media (e.g., a compact disc, a digital versatile disc, removable flash memory, etc.) that may be coupled to the second computing device 152 to provide access to the computer-readable instructions stored thereon. In particular, the computer-readable instructions stored on the memory 172 may include instructions for executing various applications, such as a unit receiver 174 (e.g., to receive the units from the first computing device 102), an unit executor 176 (e.g., to execute units, or further execute units that the first computing device 102 started to build/execute), a unit implementer 178 (e.g., to implement the units to detect and/or repair errors in the data). The second computing device 152 may further be in communication with a second data source 181 for storing/retrieving any kind of information. Furthermore, it should be understood that although the example of FIG. 1 illustrates only one data source 181 connected to the second computing device 152, any number of data sources may be connected to the second computing device 152.

The second computing device 152 may comprise any suitable device. For example, the first computing device 102 may comprise server(s), personal computer(s), a smartphone, a tablet, a phablet, etc. In some embodiments, the second computing device 152 may receive the units executed by the first computing device 102, and then use the received units to detect and repair data. The data to be repaired may come from any suitable source (e.g., the memory 152, the data source 182, and/or any other data source). In this regard, in some embodiments, the second computing device 152 is of a company (e.g., a healthcare company, a manufacturing company, etc.) that has data which the company desires to repair.

The third data source 182 may store any data for use by the first computing device 102 and/or the second computing device 152. For example, the third data source 182 may store data that it is desired to be repaired by a company of the second computing device 152. Additionally or alternatively, the third data source 182 may store data that is used to repair other data already held by the second computing device 152. Additionally or alternatively, the data stored by the third data source 182 may be data that is used to execute any of the units executed by the first computing device 102; for example, the data may be used to train a machine learning algorithm by the machine learning training application 140. Examples of the third data source 182 include credit bureau databases, healthcare provider databases, property records databases, etc.

Moreover, although the example of FIG. 1 illustrates two third data sources 182, it should be understood that there may be any number of third data sources 182 (e.g., multiple databases). Further, as will be seen, in some embodiments, having multiple third data sources 182 allows for additional aspects of error detection and correction. For example, an error in one database may be detected and/or corrected based on data in another database. For instance, an error in an address of a patient in a database of a first doctor's office may be detected and/or corrected based on data from a database of a second doctor's office, data from a publicly accessible database, etc. In this regard, the third data sources 182 may be assigned a hierarchy (e.g., if there is a discrepancy in a patient's address between a first doctor's office database, and a second doctor's office database, the information from the doctor's office database higher in the hierarchy may always be taken to be the correct information). Additionally or alternatively, between multiple third data sources 182, it may be that the more recently updated data is the data that is taken to be correct. Additionally or alternatively, a data error may be corrected based on a number of third data sources 182 that have a particular data entry (e.g., a patient's address is corrected based upon a data entry in two or more data bases of doctor's offices).

Example Signal Diagram

Some embodiments advantageously create an efficient system for detecting and/or correcting errors in company data. For instance, in some embodiments, an AI toolkit (e.g., a plurality of units) is executed at the first computing device 102, and then deployed to the second computing device 150; the second computing device 150 may then further execute the AI toolkit, and/or use the AI toolkit to detect and/or repair errors in data. Advantageously, in some situations, these techniques have been found to be many times faster than prior techniques due to the ability of the techniques disclosed herein to effectively correct thousands of records at a time, and automate particular portions of particular processes.

Figure 2:
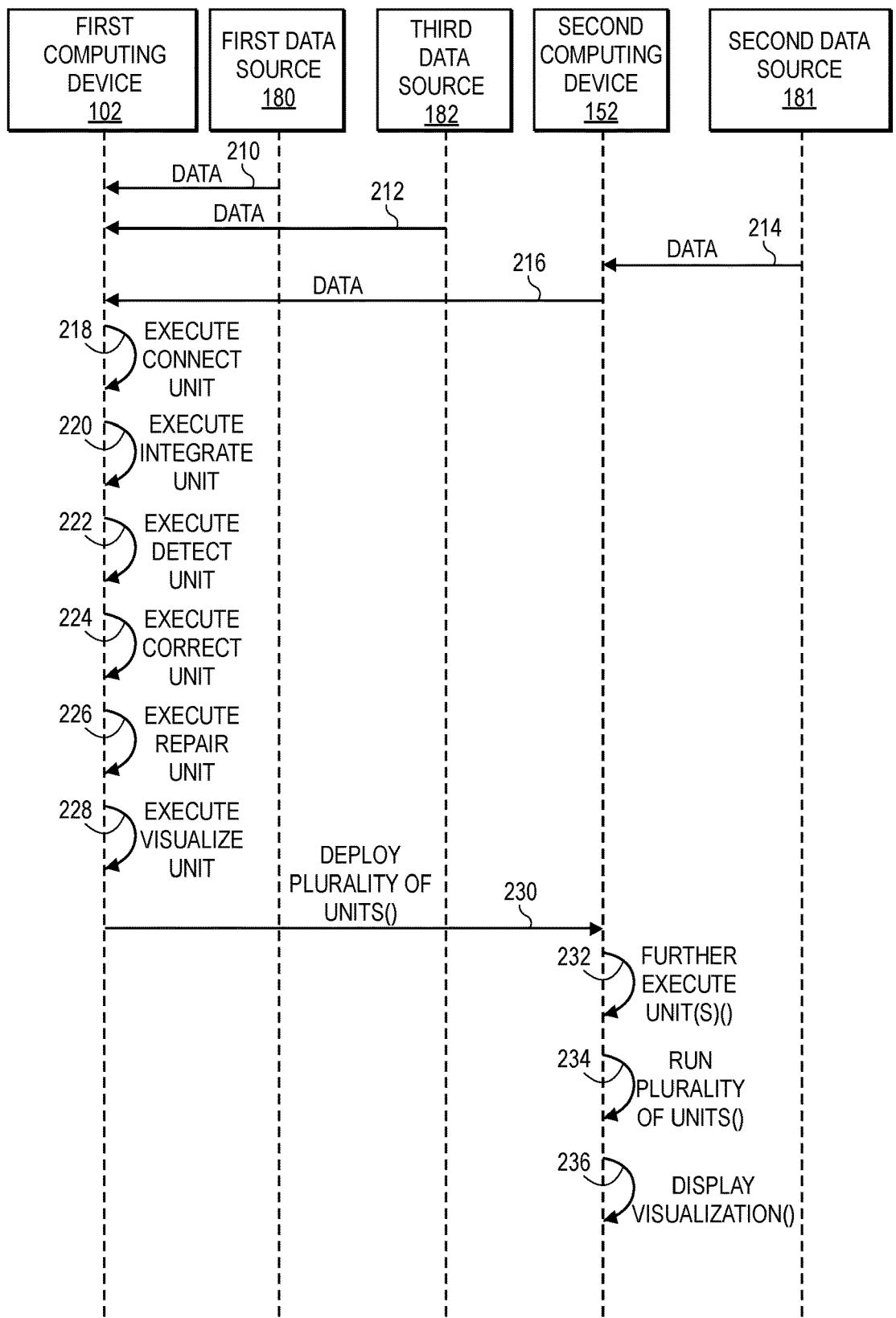
FIG. 2 illustrates an example signal diagram for improving data quality.

FIG. 2 illustrates an example signal diagram 200 for use in improving data quality. More particularly, the signal diagram 200 illustrates the signals exchanged and/or detected by various components of a system for improving data quality, such as the system 100 of the example of FIG. 1. It should be understood that in the example of FIG. 2, in some implementations, the events illustrated as performed by the first computing device 102 may be performed by the one or more first processors 120, and the events illustrated as performed by the second computing device 152 may be performed by the one or more second processors 170.

The signal diagram 200 begins by the first computing device 102 collecting data from the relevant sources. This data will be used by the first computing device 102 to execute the plurality of units prior to deploying the units to the second computing device 152. In particular, the first computing device 102 may receive (210) data from the first data source 180, and receive (212) data from the third data source 182. The second computing device 152 may receive (214) data from the second data source 181, which it may in turn send (216) to the first computing device 102 (possibly along with any other data already held by the second computing device 152).

The first computing device 102 then proceeds to execute the plurality of units. Although the units may be executed in any order, in the example of FIG. 2, the first computing device first executes (218) the connect unit 125 (e.g., with the connect unit executor 124).

The connect unit 125 may be executed such that the connect unit 125 will receive the data for which errors will be detected and corrected. For instance the connect unit 125 may be executed to receive data from any data source, such as the data sources 180, 181, 182, memory 172, etc. It should be noted that the connect unit 125 may be executed to connect to any number of data sources.

The first computing device 102 may execute (220) an integrate unit 127 such that the integrate unit 127 may receive data from the connect unit 125, join the received data together, and place the data in a common file format.

The first computing device 102 may execute (222) a detect unit 129 such that the detect unit 129 may detect errors in the data. For instance, the detect unit 129 may detect errors by identifying anomalies in the data, and/or by determining that a data record from one data source does not match a corresponding data record from another data source. In some embodiments, the detect unit 129 is executed by training a machine learning algorithm.

In embodiments where a machine learning algorithm is trained as part of executing the detect unit 129, any suitable machine learning algorithm may be used. For example, a k-nearest neighbors (KNN) machine learning algorithm, or an isolation forest machine learning algorithm may be used. With respect to the techniques described herein, a KNN machine learning algorithm is generally more sensitive (e.g., detects more anomalies) than an isolation forest machine learning algorithm. Advantageously, the detect unit 129 may be executed using more than one machine learning algorithm (e.g., using both a KNN machine learning algorithm and an isolation forest machine learning algorithm). Additionally or alternatively, any other machine learning algorithm may be used (e.g., a neural network, a random forest, a reinforcement learning algorithm, a gradient boosting algorithm, etc.). The machine learning algorithm may be trained by any suitable technique (e.g., supervised learning, unsupervised learning, semi-supervised learning).

Furthermore, the execution (222) of the detect unit 129 may create, update, and/or optimize libraries (e.g., features) of the detect unit 129 and/or any other unit. Examples of the libraries of the detect unit 129 may include functional relationship discovery, entity resolution, anomaly detection, automated profiling, internal consistency, etc. Examples of libraries of the integrate unit 127 may include liquidity, product hierarchy, maintenance, supply chain, provider, etc. Examples of libraries of the correct unit 131 may include record fusion, linguistic similarity, automated rule generation, NAIC code generation, programmatic labeling, etc. Examples of libraries of the visualize unit 135 may include error drill down, profile visualization, data quality (DQ) rule explorer, anomaly explorer, etc.

Additionally or alternatively to executing the detect unit 129, the first computing device 102 may execute a natural language processing (NLP) unit. In some embodiments, the NLP unit 137 is part of (e.g., comprised in) the detect unit 129. The NLP unit 137 is executed/trained to perform a semantic analysis on data. For example, the NLP unit 137 may determine linguistic similarities and differences between data entries in the data. In some embodiments, the NLP unit 137 is executed by training a machine learning algorithm, such as the machine learning algorithm described above with respect to the detect unit 129. For instance, the NLP unit 137 may be executed with a KNN machine learning algorithm, an isolation forest machine learning algorithm, etc.

As this illustrates, in some embodiments, the NLP unit 137 may be a part of another unit (e.g., the connect unit 125, the integrate unit 127, the detect unit 129, etc.). In this regard, the NLP unit 137 may take the form of libraries (e.g., features) within another unit. These libraries may perform the functions of the NLP unit 137 discussed herein (e.g., determining linguistic similarities and differences between data entries in the data, etc.).

The first computing device 102 may execute (224) a correct unit 131 such that the correct unit 131 may correct the detected errors in the data. For instance, if an error is detected because corresponding data entries from different data sources do not match, the correct unit 131 may determine which data record is correct (e.g., is believed to be correct at a confidence level, such as 95%). In some embodiments, the correct unit 131 is executed by training a machine learning algorithm.

In embodiments where a machine learning algorithm is trained as part of executing the correct unit 131, any suitable machine learning algorithm may be used. For example, a KNN machine learning algorithm, or an isolation forest machine learning algorithm may be used. Advantageously, the correct unit 131 may be executed using more than one machine learning algorithm (e.g., using both a KNN machine learning algorithm and an isolation forest machine learning algorithm. Additionally or alternatively, any other machine learning algorithm may be used (e.g., a neural network, a random forest, a reinforcement learning algorithm, a gradient boosting algorithm, etc.). The machine learning algorithm may be trained by any suitable technique (e.g., supervised learning, unsupervised learning, semi-supervised learning).

Additionally or alternatively to executing the correct unit 131, the first computing device 102 may execute a NLP unit 137. In some embodiments, the NLP unit 137 is part of (e.g., comprised in) the correct unit 131. The NLP unit 137 is executed/trained to perform a semantic analysis on data. For example, the NLP unit 137 may determine linguistic similarities and differences between data entries in the data. In some embodiments, the NLP unit 137 is executed by training a machine learning algorithm, such as the machine learning algorithm described above with respect to the detect and/or correct unit(s). For instance, the NLP unit 137 may be executed with a KNN machine learning algorithm, an isolation forest machine learning algorithm, etc.

The first computing device 102 may execute (226) a repair unit 133 such that the repair unit 133 may repair errors in the data. For instance, the repair unit 133 may repair errors in data by changing a data record to a record determined to be correct by the correct unit 131. In some embodiments, the repair unit 133 repairs a data record after a human has confirmed a correction for the data record determined by the correct unit 131.

The first computing device 102 may execute (228) a visualize unit 135 such that the visualize unit 135 controls a display (e.g., the user interface 123, the user interface 173, etc.) to display information of the data.

The first computing device 102 may also execute a miscellaneous unit 139. In some embodiments, the miscellaneous unit 139 may be a custom built algorithm (e.g., executable piece of code) that may be called by any of the other units (e.g., the connect unit 125, the integrate unit 127, the detect unit 129, the correct unit 131, the repair unit 133, the visualize unit 135, etc.) inside or independent of the orchestrated data quality workflow. The system may be configured to accept and internalize miscellaneous units 139 built/executed within the first computing device 102 and/or the second computing device 152.

It may be noted that any of the execute events (218, 220, 222, 224, 226, 228) may occur separately, or at the same time. For instance, any of the units may be executed simultaneously, or at separate points in time.

The first computing device 102 then deploys (230) the plurality of units to the second computing device 152. In some embodiments, prior to the deployment (230), the first computing device 102 wraps the executed plurality of units into a container. The container may comprise a package that is executable by the second computing device 152. This container can be executed in multiple environments (e.g., cloud, on-prem, hybrid-cloud).

The second computing device 152, may further execute (232) any or all of the received plurality of units. (However, it should be understood that further executing (232) is optional, and the second computing device 102 may simply proceed to run (234) the plurality of units without further executing or modifying any of the units.) For example, the second computing device 152 may further execute any of the units in the same (or similar) way that the first computing device 102 did. For example, to further execute the detect unit 129, the second computing device may train or further train the detect unit 129 using a machine learning algorithm, such as a KNN machine learning algorithm or an isolation forest machine learning algorithm. In some embodiments, the further executing of a unit is "extending" the executing or the building of the unit done by the first computing device 102.

In this regard, advantageously, the second computing device 152 may further execute any of the units based upon data that was not sent to the first computing device 102. For example, a company of the second computing device 152 may not wish (e.g., for data privacy reasons, contractual restrictions, etc.) to send a particular dataset to a company of the first computing device 102. In this situation, advantageously, the first computing device 102 may begin to train the units based upon the data that it has; and the second computing device 152 may (subsequent to receiving the units executed by the first computing device 102) continue to execute the units based on information that was not sent to the first computing device 102.

Additionally, the further executing (232) of the plurality of units may create, update, and/or optimize libraries of any of the units. For example, libraries of the detect unit 129 (e.g., functional relationship discovery, entity resolution, anomaly detection, automated profiling, internal consistency, etc.) that were created at 222 by the first computing device 102 may be updated and/or optimized at 232 by the second computing device 152.

The second computing device 152 may run (234) the plurality of units to detect errors in the data and/or repair errors in the data. The units may be all run simultaneously, or individuality. Furthermore, in some embodiments, only some of the received units are run. Moreover, in some embodiments, running the plurality of units at the second computing device 152 advantageously eliminates the need for duplication of data. For example, the data that the plurality of units are being run on may already be at the second computing device 152 so running the plurality of units at the second computing device 152 eliminates the need to duplicate the data to a different computing device (e.g., the first computing device 102).

The connect unit 125 may be run to receive the data for which errors will be detected and corrected. For instance, the connect unit 125 may be run to receive data from any data source, such as the data sources 180, 181, 182, memory 172, etc. It should be noted that the connect unit 125 may connect to any number of data sources.

The first computing device 102 may run the integrate unit 127 to receive data from the connect unit 125, join the received data together, and place the data in a common file format.

Figure 3:
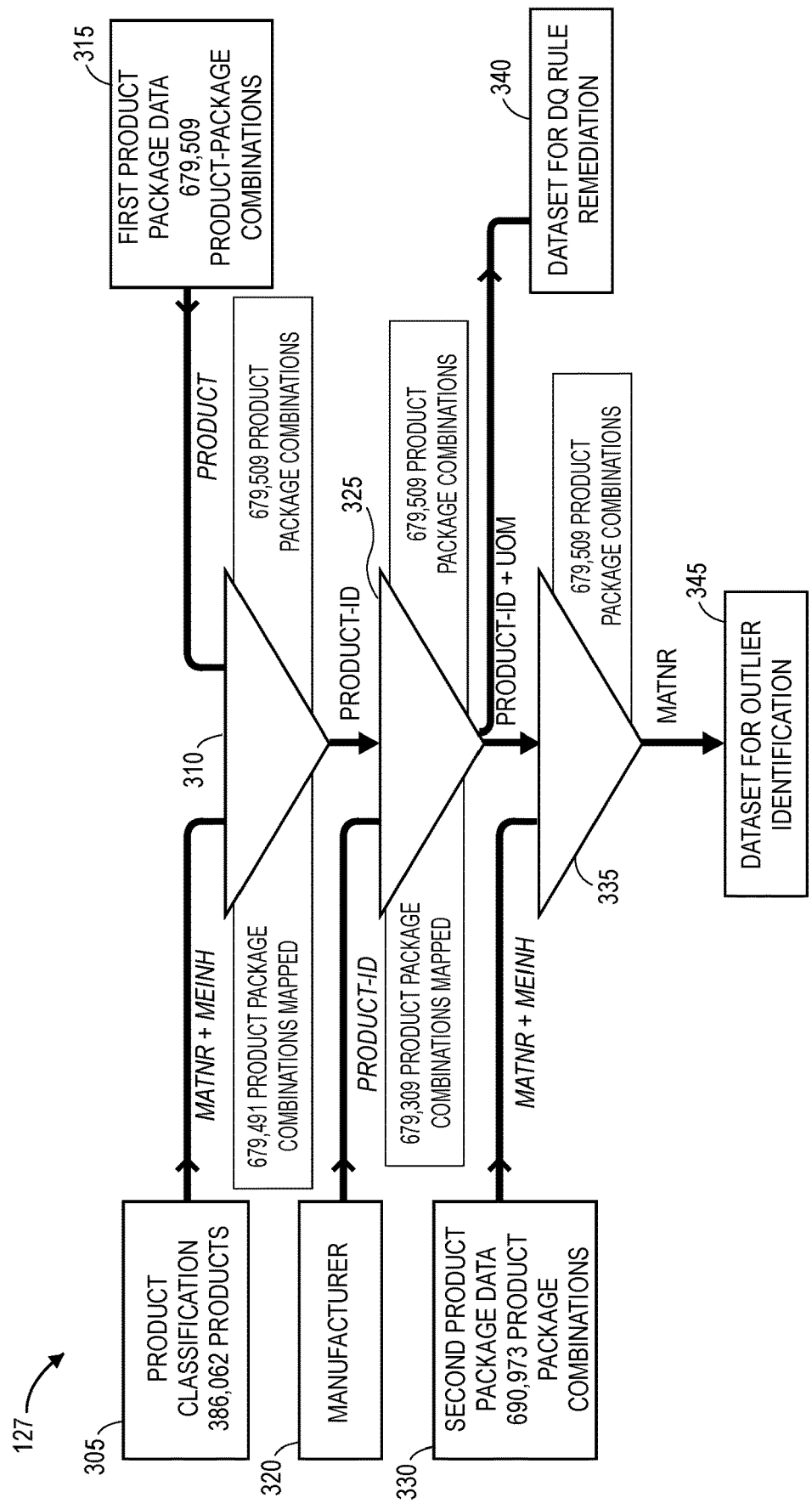
FIG. 3 illustrates an exemplary integrate unit in an example related to commercial products.

FIG. 3 illustrates an exemplary integrate unit 127 in an example related to commercial products. In this regard, and broadly speaking, the example of FIG. 3 and other techniques described herein may have many applications to commercial products. For instance, if a data of a product has the wrong dimensions for the product (e.g., an error in the data), problems are created when the company attempts to package the product for shipping. Moreover, this problem is compounded if the company attempts to combine the product with another product for packaging/shipping. It is thus advantageous for companies to identify and/or repair errors in their product dimension data.

In another example, certain products should or should not be packaged or shipped together. For instance, it may be desirable to ship one frozen product (e.g., food, medicine, etc.) with another frozen product or with another product that should be kept a lower temperature. In another example, it may be desirable not to ship a hazardous material product (e.g., a large battery) along with (e.g., in the same packaging as) other certain types of products. As can be seen, if there are errors in product classification, (e.g., a frozen product is classified as a non-frozen product), problems are created when the company attempts to package and/or ship the product.

In the example of FIG. 3, product classification (e.g., hierarchy) data 305 (e.g., received by the integrate unit 127 from the connect unit 125) may be joined (e.g., at 310) with first product package combination data 315 (e.g., received by the integrate unit 127 from the connect unit 125). The product classification data 305 may include any data, such as material information (MATNR) and/or display unit/measure information (MIENH) (e.g., product dimensional data). The first product package combination data 315 may include any data, such as product data (e.g., combinations of products and/or packaging, type of product, dimensions of product, product classification, etc.). In some embodiments, the product classification data 305 and first product package data 315 are placed in a common file format when they are joined at 310.

In the example integrate unit 127 of FIG. 3, the data joined at 310 is then further joined (e.g., at 325) with manufacturer data 320 (e.g., received by the integrate unit 127 from the connect unit 125). The manufacturer data 320 may include any data, such as product-id data. In this way, product-ids can be joined with, for example, product dimensional data. In some embodiments, the manufacturer data 320 and data joined at 310 are placed in a common file format when they are joined at 325. The data joined at 325 may then be output as a data set for DQ rule remediation 340 (e.g., to the correct unit 131 and/or the detect unit 129).

In the example integrate unit 127 of FIG. 3, the data joined at 325 is then further joined (e.g., at 335) with second product package combination data 330 (e.g., received by the integrate unit 127 from the connect unit 125). The second product package combination data 330 may include any data, such as product data (e.g., combinations of products and/or packaging, type of product, dimensions of product, product classification, etc.). In some embodiments, the second product package data 330 and data joined at 325 are placed in a common file format when they are joined at 335. A dataset for outlier identification may then be output at 345 (e.g., to the detect unit 129).

The second computing device 152 may run the detect unit 129 to detect errors in the data (e.g., data received by the detect unit 129 from the integrate unit 127). In some embodiments, the detect unit 129 detects the errors by detecting anomalies in the data (e.g., all or some of the anomalies are labeled as errors). For example, the detect unit 129 may input the data into the trained machine learning algorithm (e.g., trained by the first computing device 102) to detect the anomalies. Additionally or alternatively, the detect unit 129 may simply use a model to detect anomalies. In an example applicable to both a machine learning technique and/or modeling technique, the detect unit 129 may detect an anomaly by determining that a zip code does not match other information (e.g., other address information, such as state, street name, etc.).

In another example, the detect unit 129 may determine anomalies in the integrated data by detecting one or more outliers in a single feature (e.g., by performing a univariate analysis). Additionally or alternatively, the detect unit 129 may detect anomalies in the integrated data by detecting one or more outliers by analyzing a plurality of features (e.g., by performing a multivariate analysis). Advantageously, analyzing a plurality of features to detect the one or more outliers has been found to produce more accurate results than detecting one or more outliers based on a single feature.

Furthermore, in some embodiments, the multivariate analysis (e.g., detecting one or more outliers by analyzing a plurality of features) is performed by the detect unit 129 using more than one machine learning algorithm. For example, a KNN machine learning algorithm, and an isolation forest machine learning algorithm may be used. Advantageously, using more than one machine learning algorithm has been found to produce more accurate results than using one machine learning algorithm.

In yet another example, the detect unit 129 may determine an anomaly by determining that corresponding data entries from different data sources do not match. For instance, if a data record from the first product package data 315 does not match a corresponding record from the second product package data 330, an anomaly may be determined. In another example, if a data record from the second data source 181 does not match a corresponding data record from the third data source 182, an anomaly may be determined.

In one example implementation, the data set may relate to mortgages. The data may include information, such as mortgage rates, terms (e.g., length of loan), monthly payment information, property description (e.g., property type, city, state, address, year built, number of units, top three tenants), financial measures (e.g., net operating income (NOI), debt-service coverage ratio (DSCR), appraised value, loan-to-value (LTV), etc.). In this example implementation, the detect unit 129 may detect anomalies by determining discrepancies in the data; for example, the detect unit 129 may determine that a first loan rate of a first data record is not in accordance with other loan rates of other data records with similar values in other data fields to the first data record.

The second computing device 152 may also run the NLP unit 137 (simultaneously with or separately from running the detect unit 129). The NLP unit 137 may be (wholly or partially) comprised within the detect unit 129 or may be an entirely separate unit. The NLP unit 137 may be used to aid the detect unit 129 in determining anomalies. For instance, the NLP unit 137 may be used as part of determining that a geographic area does not match a zip code. For example, the NLP unit 137 may be used to determine that the words "New York" correspond to the state of New York so that the detect unit 129 may determine if a data record containing these words has a zip code corresponding to the state of New York.

In another example, the NLP unit 137 may be used to determine if data of particular records match. For example, the NLP unit 137 may determine that the words "New York City" are equivalent to "NYC" and to "City of New York." In this regard, in some embodiments, the NLP unit 137 performs a semantic analysis to detect anomalies.

The detect unit 129 (possibly in conjunction with the NLP unit 137) may further determine and/or assign a quality rating (e.g., a data quality risk score (DQRS)) to the individual records and/or datasets. In some embodiments, the quality rating is a numerical value that may be translated (e.g., by the numerical value being in certain ranges) to a low, medium or high rating.

Figure 4:
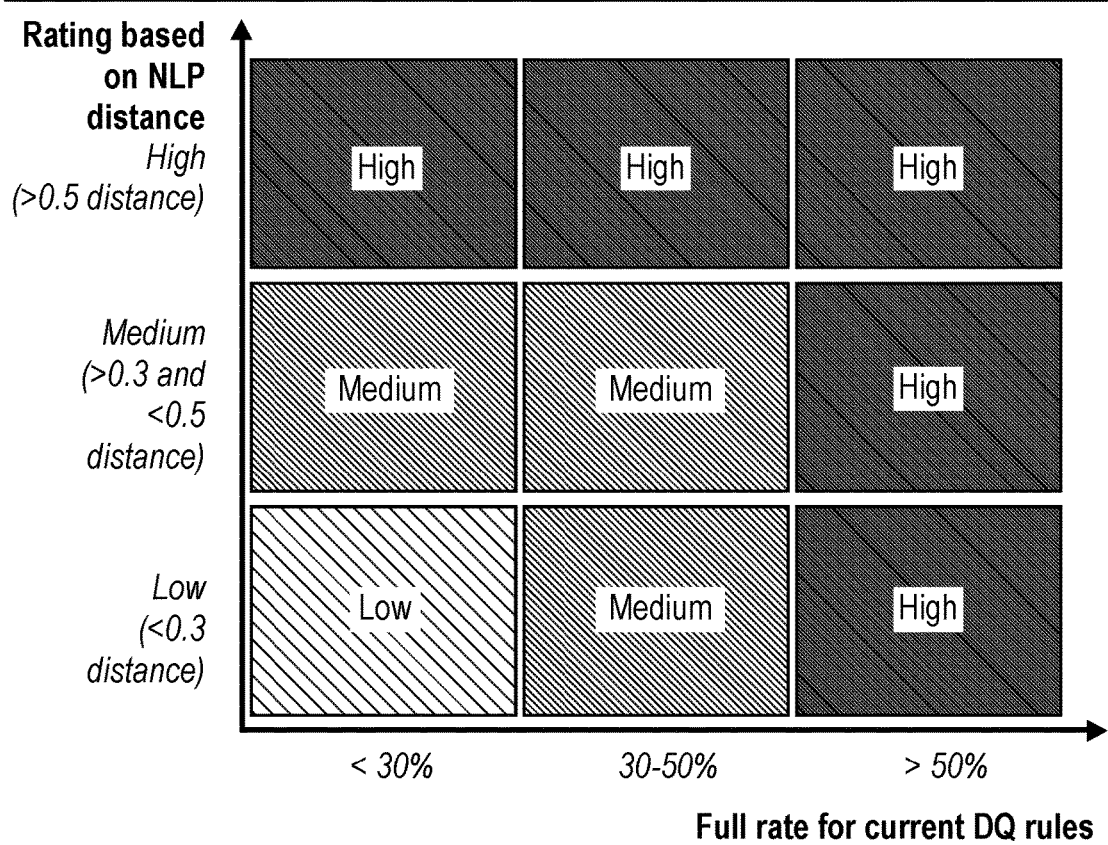
FIG. 4 illustrates an example of classifying a data quality risk score (DQRS).

FIG. 4 illustrates an example of classifying a DQRS as low, medium, or high. With reference thereto, the graph 400 has a y-axis showing a rating based on an NLP distance (e.g., determined by the NLP unit 137). In some embodiments, the NLP distance indicates how close to an expected value a particular record is. The graph 400 further has an x-axis of a fail rate (e.g., as a percentage) of current data quality (DQ) rules (e.g., as determined by the correct unit 131, or as determined prior to executing and/or deploying the units). Thus, in the example of FIG. 4, each product has two ratings (a rating based on NLP distance, and a fail rate). Furthermore, as in the example of FIG. 4, the quality rating (e.g., the DQRS) may be taken to be the higher of the classification from either of the two ratings.

In addition, the detect unit 129 and/or the NLP unit 137 may detect errors in groups that have been previously organized (e.g., product groups, job groups, store groups, etc.). Each record organized into a group has a description (e.g., from the data of any of the data sources 180, 181, 182). For instance, there may be a product description, a job description, etc. The NLP unit 137 may train an NLP model (e.g., using word-embedding) that vectorizes a phrase (e.g., from the description) corresponding to each record; and then transforms the phase into a vector (e.g., "great food" is transformed to [1,2,5,2]). The vector corresponds to the phrase's meaning, where phrases with vectors which are closer have more similar meaning. The detect unit 129 may next determine which records are in the wrong group. To this end, the detect unit 129 may compare the distance of each record to each other record in its group. The detect unit 129 may identify a threshold (e.g., through numerical analysis and expert input) where a record is too dissimilar to others in its group, thereby identifying an anomaly.

In addition, the detect unit 129 and/or the NLP unit 137 may detect errors based on a nearest neighbors type algorithm. For instance, regarding the product dimensions used for shipping example discussed above, errors may be detected using a nearest neighbors based approach (e.g., an error is detected based on data entries for similar products indicating that the similar products have substantially different dimensions).

The second computing device 152 may run the correct unit 131 on the data (e.g., integrated by the integrate unit 127). In some embodiments, the correct unit 131 determines a recommended correction to a record (e.g., to eliminate an anomaly detected by the detect unit 129). For example, if a record contains a zip code and state that do not match, the correct unit may determine that the state should be corrected to a different state (e.g., "Wisconsin" corrected to "Iowa"). The recommended correction may be determined based on any suitable data. For instance, the recommended correction may be determined based on other relevant data, such as address information, phone number area code, comparison with data records from other sources, etc. Furthermore, the recommended correction may be determined by any suitable technique. For example, the correction may be determined by a model and/or by machine learning algorithm(s).

As will be described further below with respect to the repair unit 133, in some embodiments, once the recommended correction is determined, it may be presented to a human user who may confirm if the data should be changed (e.g., repaired) according to the recommended correction. For example, the second computing device 152 (e.g., through the user interface 173) may present the human user with a recommended correction of correcting a record from "Wisconsin" to "Iowa." And, if the user confirms that the record should be changed in accordance with this recommendation, the record is repaired from "Wisconsin" to "Iowa." In this way, in some embodiments using machine learning algorithm(s), the machine learning algorithm(s) of the correct unit 131 may be further trained (e.g., by supervised learning) according to the input from the human user.

Furthermore, the correct unit 131 may also determine a confidence level (e.g., 95%, etc.) of the recommended correction. In some embodiments, the confidence level is presented to the human user (e.g., along with the recommended correction) to help the human user determine if the record should be changed.

In some embodiments using machine learning algorithm(s), the confidence level may be determined based on consensus determined by the machine learning algorithm(s). Furthermore, the confidence level may be classified (e.g., into low, medium, high). In this regard, FIG. 5 shows an example 500 of determining a confidence level based on consensus, and classifying determined the confidence level. In particular, in the example of FIG. 5, the confidence level is classified as high if there is any of: a consensus with a >75% majority, a high confidence automated correction (procedural or lookup), or the recommendation of the NLP model has a high confidence distance (<0.3). Further in the example of FIG. 5, the confidence level is classified as medium if there is a consensus with >60% and <75% majority, there is a medium confidence automated correction (procedural or lookup), or the recommendation of the NLP model has medium confidence distance (>0.3 and <0.5). Still further in the example of FIG. 5, the confidence level is classified as low if there is a consensus of >50% and <60% majority, or the recommendation of the NLP model has a low confidence distance (>0.5).

Moreover, the correct unit 131 may determine rules for determining the recommended corrections (e.g., to eliminate anomalies in the data). For example, a rule may be determined linking a zip code to a state or other geographic area. In another example, rules may be determined about what products may be shipped together. For instance, a product may be determined to ship as frozen, and a rule may be determined to ship the product with other frozen products.

In yet another example, the rule may be a rule comprising a link between a product category, and a placement in a product hierarchy (e.g., classification). For instance, there may be a rule linking a product category of gloves to a product hierarchy of personal protective equipment (PPE).

In some embodiments, a confidence level of the rule is also determined. The confidence level may be determined by any suitable technique. For instance, similarly to the example of FIG. 5, the confidence level of the rule may be determined based on consensus (e.g., if a machine learning algorithm is used).

In some embodiments using machine learning algorithm(s), the rule is determined through a supervised learning process. For example, the potential (e.g., recommended) corrections may be presented to a human user, and the human user may indicate whether or not to repair the data in accordance with the potential correction, thereby training the machine learning algorithm and allowing for rule generation.

It may be noted that the correct unit 131 may run the same or different machine learning algorithm(s) for the correction recommendations as for the rule corrections. For example, the correct unit 131 may run a single (or a plurality of) machine learning algorithm to determine both a recommendation and a rule; alternatively, the corrections unit may run separate machine learning algorithms: one or more machine learning algorithms to determine recommendations, and one or more machine learning algorithms to determine correction rules.

The second computing device 152 may also run the NLP unit 137 (simultaneously with or separately from running the correct unit 131). The NLP unit 137 may be (wholly or partially) comprised within the correct unit 131 or may be an entirely separate unit. Furthermore, the NLP unit 137 may be the same or different NLP unit 137 as the NLP unit 137 that is run in conjunction with the detect unit 129.

The NLP unit 137 may be used to aid the correct unit 131 in determining recommended corrections. For instance, the NLP unit 137 may be used as part of determining a recommended correction for the situation of when a geographic area does not match a zip code.

In some embodiments, the correct unit 131 and the NLP unit 137 may correct errors in groups that have been previously organized (e.g., product groups, job groups, store groups, etc.) in line with the example described above with respect to the detect unit 129. In particular, each record organized into a group has a description (e.g., from the data of any of the data sources 180, 181, 182). For instance, there may be a product description, a job description, etc. The NLP unit 137 may train an NLP model (e.g., using word-embedding) that vectorizes a phrase (e.g., from the description) corresponding to each record; and then transforms the phase into a vector (e.g., "great food" is transformed to [1,2,5,2]). The vector corresponds to the phrase's meaning, where phrases with vectors which are closer have more similar meaning. As described above, the detect unit 129 may next determine which records are in the wrong group. Subsequently, the correct unit 131 may determine recommended corrections by comparing vectors. For example, the correct unit 131 may compare a vector of a description in a record (e.g., determined by the detect unit 129 to be classified into the wrong group) to vector(s) from other groups, and determine a recommendation to correct the record to a different group based on the comparison (e.g., determine a recommendation to change the record to another group determined to have shortest distances to the vector).

The second computing device 152 may run the repair unit 133 on the data (e.g., integrated by the integrate unit 127, corrected by the correct unit 131, etc.) to repair the data. For example, the repair unit 133 may change (e.g., repair) the data in accordance with recommended corrections determined by the correct unit 131. For example, in some embodiments, once a human user has confirmed that a correction recommendation made by the correct unit 131 should be implemented, the repair unit 133 may repair the data. For instance, in some embodiments, the repair unit 133 controls the display 173 to display the recommendation (and also possibly the confidence level of the recommendation) to the human user so that the human user can determine whether to repair the data or not with the recommendation.

However, in other embodiments, the process is fully automated, and no human input is required. For example, in some embodiments, if the confidence level of a recommendation to change a record is above a threshold value (e.g., 50%, 75%, 90%, etc.), the repair unit 133 automatically repairs the record by replacing data of the record with the recommendation.

In certain situations, it may be advantageous to run a unit individually. For example, if only data profiling is needed, it may be advantageous to run only the detect unit 129 rather than run the entire plurality of units as a group. To this end, some embodiments include an orchestration layer that sequences calls to each of the units; and, the units are each individually configured such that they may be decoupled from the orchestration layer to allow the unit to be individually run. Furthermore, once decoupled from the orchestration layer, the individual units may be run in conjunction with external units or tools. For instance, the second computing device 152 may decouple an individual unit, and then run the individual unit along with other unit(s) that were not sent by the first computing device 102.

The second computing device 152 may run the visualize unit 135 to display (236) (e.g., at the user interface 173) any information. For example, the visualize unit 135 may be used to display recommendations (possibly along with confidence levels of the recommendations), as described above. The visualize unit 135 may further display any information in accordance with the principles discussed herein. For instance, the visualize unit 135 may be used to display a list of rules (e.g., determined by the correct unit 131) (optionally along with the corresponding confidence levels of the rules). In this example, the visualize unit 135 may receive/collect the rules determined by the correct unit 131, which the visualize unit 135 then uses to generate the list of rules. Similarly, the visualize unit 135 may also receive/collect a list of anomalies from the detect unit 129, which the visualize unit 135 then uses to generate and display a list of anomalies.

Figure 6:
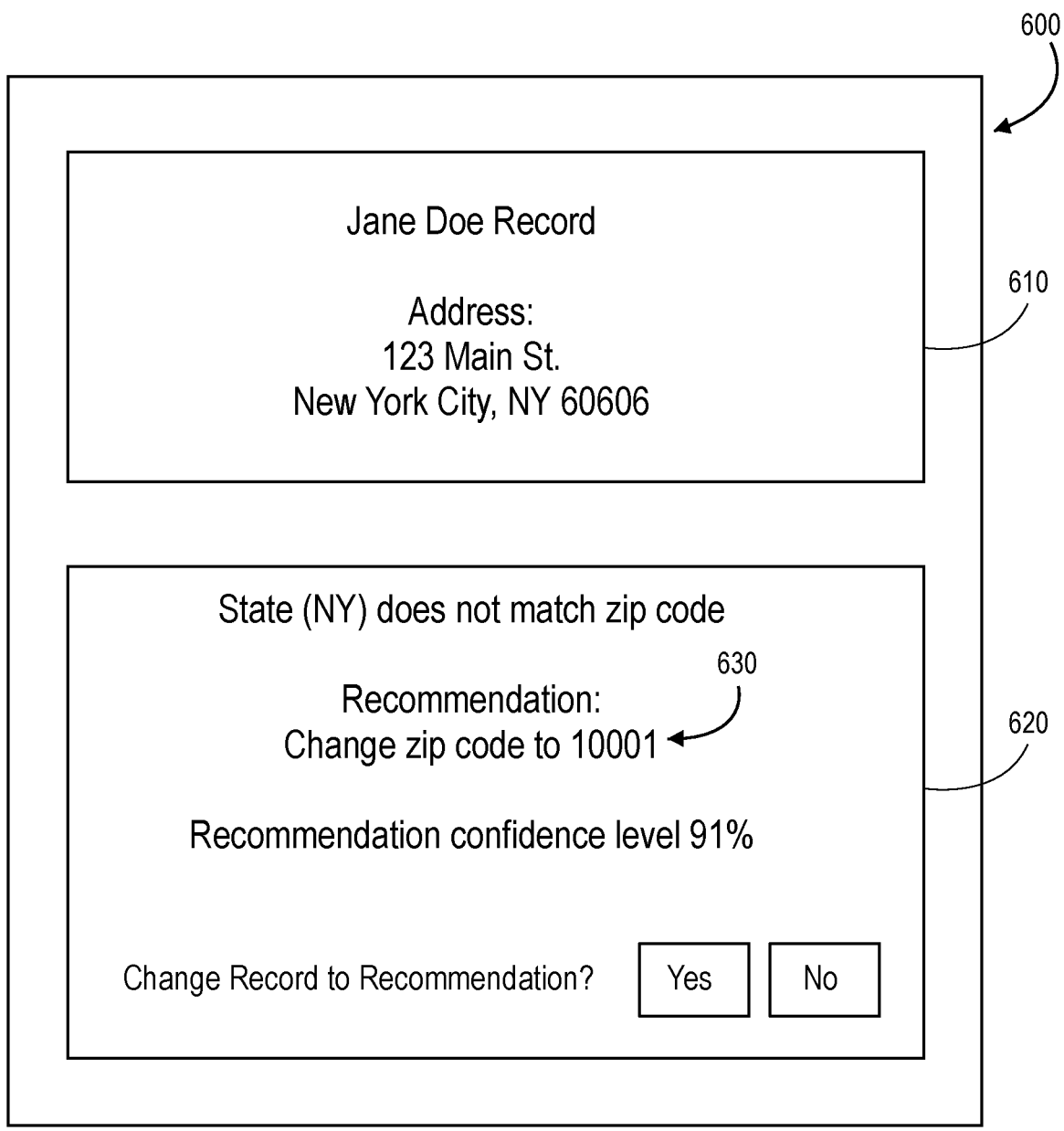
FIG. 6 illustrates an example display indicating a recommendation to change a record, and confidence level of the recommendation.

FIG. 6 illustrates an example display 600 indicating a recommendation to change a record, and confidence level of the recommendation. The display 600 may be displayed at any suitable device (e.g., user interface 123, user interface 173, etc.). The display 600 may indicate a record 610 which the detect unit 129 has found to have an error in. In particular, the state and zip code of the record 610 do not match. In this regard, it should be understood that the display 600 may indicate information of why the detect unit has detected a particular error (e.g., the display 600 indicates profiling information of the particular error). In the example of FIG. 6, the correct unit 131 has determined (at a 91% confidence level) a recommendation 630 to change the zip code to 10001, which may be displayed in the recommendation box 620. A human user may indicate (e.g., through the recommendation box 620) whether or not to repair the record to have the recommended zip code.

Figure 7:
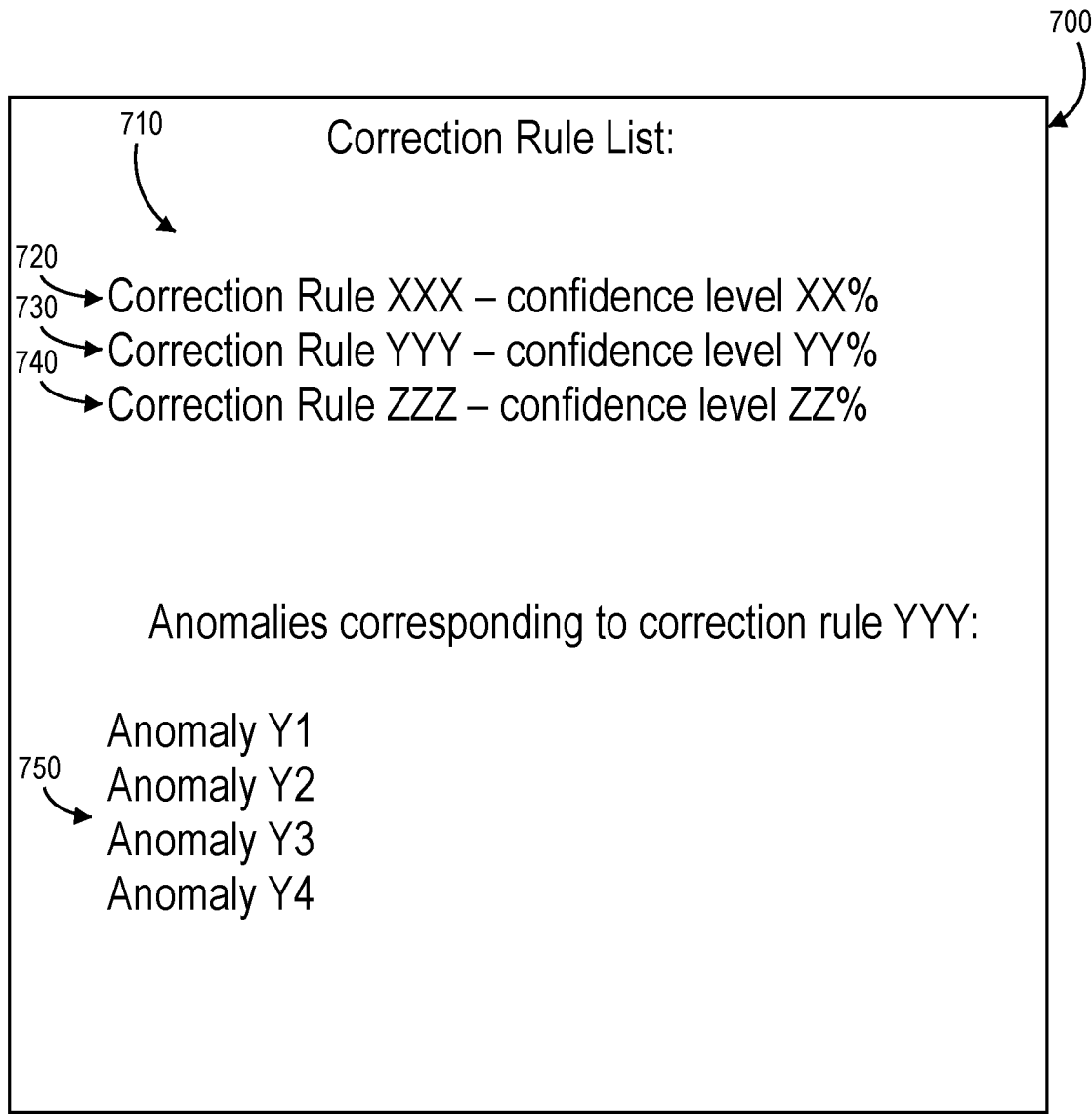
FIG. 7 illustrates an example of displaying a list of correction rules and a list of anomalies.

FIG. 7 illustrates an example of displaying a list of correction rules and a list of anomalies. With reference thereto, the display 700 may be displayed at any suitable device (e.g., user interface 123, user interface 173, etc.). The display 700 may display a correction rule list 710, which may include corrections rules 720, 730, 740 (and corresponding confidence levels although it should be appreciated that displaying a confidence level along with rule(s) is optional). The display 700 may further display a list of anomalies. In some embodiments, the displayed list of anomalies corresponds to one or more of the correction rules. In the illustrated example, a user has selected correction rule 730, and thus the display 700 displays the list of anomalies 750 corresponding to the correction rule 730. It should be appreciated that the list of correction rules may comprise any number of correction rules; and the list of anomalies may comprise any number of anomalies.

It may be noted that the displays in the examples of FIGS. 6 and 7 may be controlled by the visualize unit 135, correct unit 131, repair unit 133, miscellaneous unit 139, or any other unit.

Example Method

Figure 8:
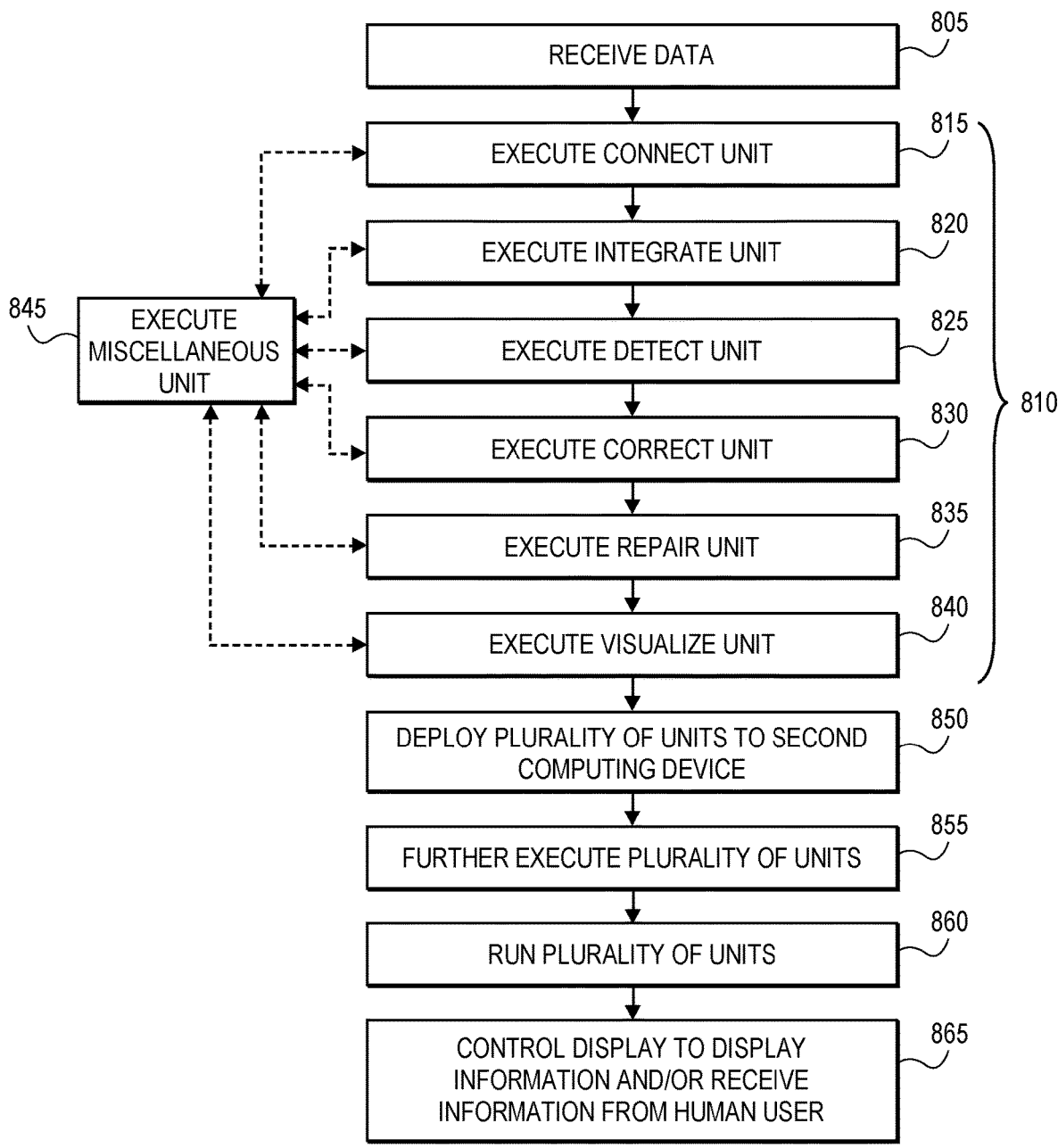
FIG. 8 illustrates an example method for use in improving data quality.

FIG. 8 illustrates an example method 800 for use in improving data quality. It should be understood that the method 800 is an example, and may include additional, fewer, or alternate actions, including those discussed elsewhere herein. Moreover, the blocks of FIG. 8 may be performed in any suitable order (e.g., the units do not necessary need to be executed in the order depicted by the order of blocks 815, 820, 825, 830, 835, 840, 845).

The example method 800 begins by the one or more first processors 120 receiving data (e.g., from the data sources 180, 181, 182, etc.) at block 805. Then, the one or more first processors 120 executes a plurality of units at sequence of blocks 810. This may include executing, for example, a connect unit 125 (block 815), an integrate unit 127 (block 820) a detect unit 129 (block 825) (which may include executing a NLP unit 137 as part of the detect unit 129), a correct unit 131 (block 830) (which may include executing a NLP unit 137 as part of the correct unit 131), a repair unit 133 (block 835), a visualize unit 135 (block 840), and/or a miscellaneous unit 139 (block 845).

It should be understood that the execution of the miscellaneous unit 845 (e.g., a custom unit, an NLP unit, etc.) may be done separately from the execution of any of the other units (e.g., blocks 815, 820, 825, 830, 835, 840). Additionally or alternatively, the execution of the miscellaneous unit at block 845 may be done during the execution of any other units (e.g., blocks 815, 820, 825, 830, 835, 840). For example, the execution of the miscellaneous unit may be done as part of the execution of any of the other units.

The plurality of units executed by the one or more first processors 120 are then deployed to the one or more second processors 170 at block 850. The one or more second processors 170 may optionally then further execute any of the units of the plurality of units at block 855. For example, the one or more second processors 170 may further train any machine learning algorithms that are part of any of the units.

Any or all of the units may then be run/executed at block 860 to detect errors in data, and/or repair errors in the data. Furthermore, when the units are run, an audit log may be created/maintained (e.g., by the first computing device 102 and/or the second computing device 152). In some embodiments, the audit log may be viewable by the first computing device 102, and/or the second computing device 152. The audit log may include any information generated by running and/or executing the plurality of units. For example, the audit log may include information of errors detected by the detect unit 129, corrections recommended by the correct unit 131, repairs made by the repair unit 133, displays generated by the visualize unit 135, input received from a user, etc.

A display (e.g., user interface 123, user interface 173, etc.) may then be controlled at block 865 to display any information of the data, detected errors of the data, recommended corrections to the data, confidence level of data records, rules, confidence levels of the rules, and so forth, as described herein. For example, a display may be controlled to display either of the example displays of FIGS. 6 and/or 7.

Additional Exemplary Embodiments

Aspect 1. A computer system for use in improving data quality, the computer system comprising one or more first processors configured to:
execute a plurality of units, the plurality of units comprising:
   a connect unit configured to receive, through one or more second processors, data from one or more data sources;
   an integrate unit configured to: (i) receive the data from the connect unit, (ii) prepare the data for analysis by integrating the data; and
   a detect unit configured to: (i) receive the integrated data from the integrate unit, and (ii) detect anomalies in the integrated data; and
deploy, from the one or more first processors to the one or more second processors, the executed plurality of units.

Aspect 2. The computer system of aspect 1, the plurality of units executed by the one or more first processors further comprising a correct unit configured to: (i) determine a recommendation to change a record of the integrated data to eliminate an anomaly detected by the detect unit, and (ii) determine a confidence level that the recommendation is correct.

Aspect 3. The computer system of any one of aspects 1-2, the correct unit further configured to:
train a recommendation machine learning algorithm based upon input received from a user; and
determine the recommendation by inputting data of the record into the trained recommendation machine learning algorithm.

Aspect 4. The computer system of any one of aspects 1-3, the correct unit further configured to: (iii) generate a correction rule for determining the recommendation to change the record of the integrated data to eliminate the anomaly.

Aspect 5. The computer system of any one of aspects 1-4, the correct unit further configured to generate the correction rule by training a rule correction machine learning algorithm by receiving input from a user.

Aspect 6. The computer system of any one of aspects 1-5, the correction rule comprising a link between a postal zip code and a geographic location.

Aspect 7. The computer system of any one of aspects 1-6, the plurality of units executed by the one or more first processors further comprising a repair unit configured to: (i) control a display to present the recommendation determined by the correct unit, (ii) receive an input indicating if the presented recommendation is correct, and (iii) if the input indicates that the presented recommendation is correct, change the record according to the presented recommendation.

Aspect 8. The computer system of any one of aspects 1-7, the plurality of units executed by the one or more first processors further comprising a visualize unit configured to: (i) generate a list of anomalies from anomalies detected by the detect unit, and (ii) control a display to display the list of anomalies.

Aspect 9. The computer system of any one of aspects 1-8, the detect unit further configured to measure quality of individual records of the integrated data, and assign a quality rating to the individual records.

Aspect 10. The computer system of any one of aspects 1-9, the plurality of units executed by the one or more first processors further comprising:
a correct unit configured to: (i) simultaneously train, based on input received from a user, a recommendation machine learning algorithm, and a rule correction machine learning algorithm, (ii) determine, by inputting data of a record into the trained recommendation machine learning algorithm: (a) a recommendation to change the record of the integrated data to eliminate an anomaly detected by the detect unit, and (b) a confidence level that the recommendation is correct, and (iii) generate correction rules by inputting records into the trained rule correction machine learning algorithm;
a repair unit configured to: (i) control a display to present: (a) the recommendation determined by the correct unit, and (b) the confidence level that the recommendation is correct, (ii) receive an input indicating if the presented recommendation is correct, and (iii) if the input indicates that the presented recommendation is correct, change the record according to the presented recommendation; and
a visualize unit configured to: (i) generate a list of correction rules from correction rules generated by the detect unit, (ii) control a display to display the list of rules, (iii) receive input specifying a rule from the list of rules, and (iv) in response to receiving the input specifying the rule, display a list of anomalies corresponding to the specified rule.

Aspect 11. The computer system of any one of aspects 1-10:
the one or more data sources comprising a first data source and a second data source; and
the detect unit being further configured to detect the anomalies in the integrated data by determining that data of a record from the first data source does not match data from the second data source corresponding to the record.

Aspect 11 a. The computer system of any one of aspects 1-11, the detect unit further:
comprising a natural language processing unit NLP unit configured to perform a semantic analysis on the integrated data to determine a NLP distance for a record, the NLP distance being a distance from the record to an expected value;
configured to determine a fail rate of the record based on data quality rules; and
configured to determine a classification of a data quality for the record based on a selection of either a classification of the NLP distance or a classification of the fail rate.

Aspect 11b. The computer system of any one of aspects 1-11a, the one or more first processors further configured to wrap the executed plurality of units into a container, the container comprising a package that is executable by the one or more second processors.

Aspect 11c. The computer system of any one of aspects 1-11b, each unit of the plurality of units further configured to be decoupled from an orchestration layer such that each unit of the plurality of units may be executed individually.

Aspect 11d. The computer system of any one of aspects 1-11c, the one or more second processors are configured to maintain an audit log, the audit log comprising information of anomalies detected by the detect unit, and/or information of recommendations to change records determined by the correct unit.

Aspect 11e. The computer system of any one of aspects 1-11d, the detect unit further configured to detect the anomalies by executing a library of the detect unit.

Aspect 12. A computer-implemented method for use in improving data quality, the method comprising:
receiving, with one or more second processors from one or more first processors, a plurality of units, the plurality of units comprising a connect unit, an integrate unit, and a detect unit;
with the received connect unit and at the one or more second processors, receiving data from one or more data sources;
with the received integrate unit and at the one or more second processors: (i) receiving the data from the connect unit, (ii) preparing the data for analysis by integrating the data; and
with the detect unit and at the one or more second processors: (i) receiving the integrated data from the integrate unit, and (ii) detecting anomalies in the integrated data.

Aspect 13. The computer-implemented method of aspect 12, the plurality of units received by the one or more second processors further comprising a correct unit, and the method further comprising:
with the received correct unit, and at the one or more second processors: (i) determining a recommendation to change a record of the integrated data to eliminate an anomaly detected by the detect unit, (ii) determining a confidence level that the recommendation is correct, and (iii) generating a correction rule for determining the recommendation to change the record of the integrated data to eliminate the anomaly.

Aspect 14. The computer-implemented method of any one of aspects 12-13, the correction rule comprising a link between a product category, and a placement in a product hierarchy.

Aspect 15. The computer-implemented method of any one of aspects 12-14, the plurality of units received by the one or more second processors further comprising a repair unit, and the method further comprising:
with the received repair unit, and at the one or more second processors: (i) controlling a display to present the recommendation determined by the correct unit, (ii) receiving an input indicating that the presented recommendation is correct, and (iii) in response to the indication that the presented recommendation is correct, changing the record according to the presented recommendation.

Aspect 16. The computer-implemented method of any one of aspects 12-15, the plurality of units received by the one or more second processors further comprising a correct unit, a repair unit, and a visualize unit, and the method further comprising:
with the correct unit and at the one or more second processors: (i) simultaneously training, based on input received from a user, a recommendation machine learning algorithm, and a rule correction machine learning algorithm, (ii) determining, by inputting data of a record into the trained recommendation machine learning algorithm: (a) a recommendation to change the record of the integrated data to eliminate an anomaly detected by the detect unit, and (b) a confidence level that the recommendation is correct, and (iii) generating correction rules by inputting records into the trained rule correction machine learning algorithm;
with the repair unit and at the one or more second processors: (i) controlling a display to present the recommendation determined by the correct unit, (ii) receiving an input indicating that the presented recommendation is correct, and (iii) in response to the indication that the presented recommendation is correct, changing the record according to the presented recommendation; and
with the visualize unit and at the one or more second processors: (i) generating a list of correction rules from correction rules generated by the detect unit, (ii) controlling a display to display the list of rules, (iii) receiving input specifying a rule from the list of rules, and (iv) in response to receiving the input specifying the rule, displaying a list of anomalies corresponding to the specified rule.

Aspect 17. The computer-implemented method of any one of aspects 12-16, the detect unit further comprising a natural language processing (NLP) unit, and the method further comprising:
with the NLP unit and at the one or more second processors, analyzing the integrated data according to a semantic analysis; and
the detecting of the anomalies in the integrated data comprising detecting the anomalies based on the semantic analysis.

Aspect 18. The computer-implemented method of any one of aspects 12-17, further comprising:
with the detect unit and at the one or more second processors, detecting the anomalies in the integrated data by detecting one or more outliers in a single feature.

Aspect 19. The computer-implemented method of any one of aspects 12-18, further comprising:
with the detect unit and at the one or more second processors, detecting the anomalies in the integrated data by detecting one or more outliers by analyzing a plurality of features.

Aspect 20. The computer-implemented method of any one of aspects 12-19, the analyzing of the plurality of features comprising analyzing the plurality of features through a machine learning algorithm comprising either a k-nearest neighbors (KNN) machine learning algorithm, or an isolation forest machine learning algorithm.

Aspect 21. The computer-implemented method of any one of aspects 12-20, the detect unit further comprising a natural language processing (NLP) unit, and the method further comprising:

with the NLP unit, assigning a first vector to a phrase of a first record;

with the detect unit, comparing the first vector to a second vector, the second vector corresponding to a second record, the second record being of a same group as the first record;

and with the detect unit and based on the comparison, determining that the first record was categorized into a wrong group.

Other Matters

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer system for use in improving data quality, the computer system comprising one or more first processors configured to:
   execute a plurality of units, the plurality of units including:
   a connect unit configured to receive, through one or more second processors, data from one or more data sources;
   an integrate unit configured to: (i) receive the data from the connect unit, (ii) prepare the data for analysis by integrating the data by placing the data in a common file format;
   a detect unit including a natural language processing (NLP) unit configured to assign a first vector to a phrase of a first record, and wherein the detect unit is configured to: (i) receive the integrated data from the integrate unit, and (ii) detect anomalies in the integrated data by comparing the first vector to a second vector, the second vector corresponding to a second record, the second record being of a same group as the first record; and
   a correct unit configured to: (i) determine a recommended correction to a record of the integrated data to eliminate an anomaly detected by the detect unit in the integrated data received from the integrate unit through the one or more second processors, and (ii) simultaneously train, based on input received from a user: (a) a recommendation machine learning algorithm to generate recommendations for corrections to anomalies, and (b) a rule correction machine learning algorithm; and deploy, from the one or more first processors to the one or more second processors, the executed plurality of units.

2. The computer system of claim 1, the correct unit further configured to determine a confidence level that the recommended correction is correct.

3. The computer system of claim 2, the correct unit further configured to:

determine the recommended correction by inputting data of the record into the trained recommendation machine learning algorithm.

4. The computer system of claim 2, the correct unit further configured to generate a correction rule for determining the recommended correction to change the record of the integrated data to eliminate the anomaly.

5. The computer system of claim 4, the correct unit further configured to generate the correction rule.

6. The computer system of claim 4, the correction rule comprising a link between a postal zip code and a geographic location.

7. The computer system of claim 2, the plurality of units executed by the one or more first processors further comprising a repair unit configured to: (i) control a display to present the recommended correction determined by the correct unit, (ii) receive an input indicating if the presented recommended correction is correct, and (iii) if the input indicates that the presented recommended correction is correct, change the record according to the presented recommended correction.

8. The computer system of claim 1, the plurality of units executed by the one or more first processors further comprising a visualize unit configured to: (i) generate a list of anomalies from anomalies detected by the detect unit, and (ii) control a display to display the list of anomalies.

9. The computer system of claim 1, the detect unit further configured to measure quality of individual records of the integrated data, and assign a quality rating to the individual records.

10. The computer system of claim 1, wherein:

the correct unit is further configured to: (i) determine, by inputting data of a record into the trained recommendation machine learning algorithm: (a) the recommended correction to the record of the integrated data to eliminate an anomaly detected by the detect unit, and (b) a confidence level that the recommendation is correct, and (ii) generate correction rules by inputting records into the trained rule correction machine learning algorithm; and the plurality of units executed by the one or more first processors further comprises:

a repair unit configured to: (i) control a display to present: (a) the recommendation determined by the correct unit, and (b) the confidence level that the recommendation is correct, (ii) receive an input indicating if the presented recommendation is correct, and (iii) if the input indicates that the presented recommendation is correct, change the record according to the presented recommendation; and a visualize unit configured to: (i) generate a list of correction rules from correction rules generated by the detect unit, (ii) control a display to display the list of rules, (iii) receive input specifying a rule from the list of rules, and (iv) in response to receiving the input specifying the rule, display a list of anomalies corresponding to the specified rule.

11. The computer system of claim 1:

the one or more data sources comprising a first data source and a second data source; and the detect unit being further configured to detect the anomalies in the integrated data by determining that data of a record from the first data source does not match data from the second data source corresponding to the record.

12. The computer system of claim 1, wherein the recommended correction is a recommended numerical correction.

13. The computer system of claim 1, each unit of the plurality of units further configured to be decoupled from an orchestration layer such that each unit of the plurality of units may be executed individually.

14. A computer-implemented method for use in improving data quality, the method comprising:

receiving, with one or more second processors from one or more first processors, a plurality of units, the plurality of units comprising a connect unit, an integrate unit, a detect unit, and a correct unit;

with the received connect unit and at the one or more second processors, receiving data from one or more data sources;

with the received integrate unit and at the one or more second processors: (i) receiving the data from the connect unit, (ii) preparing the data for analysis by integrating the data by placing the data in a common file format;

with the received detect unit and at the one or more second processors: (i) receiving the integrated data from the integrate unit, and (ii) detecting anomalies in the integrated data; and with the received correct unit and at the one or more second processors: (i) determining a recommended correction to a record of the integrated data to eliminate an anomaly detected by the detect unit in the integrated data received from the integrate unit, and (ii) simultaneously training, based on input received from a user: (a) a recommendation machine learning algorithm to generate recommendations for corrections to anomalies, and (b) a rule correction machine learning algorithm;

wherein the detect unit further includes a natural language processing (NLP) unit, and the method further includes:

with the NLP unit, assigning a first vector to a phrase of a first record;

with the detect unit, comparing the first vector to a second vector, the second vector corresponding to a second record, the second record being of a same group as the first record; and with the detect unit and based on the comparison, determining that the first record was categorized into a wrong group.

15. The computer-implemented method of claim 14, the method further comprising:

with the received correct unit, and at the one or more second processors, determining a confidence level that the recommended correction is correct, and generating a correction rule for determining the recommended correction to change the record of the integrated data to eliminate the anomaly.

16. The computer-implemented method of claim 15, the correction rule comprising a link between a product category, and a placement in a product hierarchy.

17. The computer-implemented method of claim 15, the plurality of units received by the one or more second processors further comprising a repair unit, and the method further comprising:

with the received repair unit, and at the one or more second processors: (i) controlling a display to present the recommended correction determined by the correct unit, (ii) receiving an input indicating that the presented recommended correction is correct, and (iii) in response to the indication that the presented recommendation is correct, changing the record according to the presented recommended correction.

18. The computer-implemented method of claim 14, further comprising:

with the detect unit and at the one or more second processors, detecting the anomalies in the integrated data by detecting one or more outliers in a single feature.

19. The computer-implemented method of claim 14, further comprising:

with the detect unit and at the one or more second processors, detecting the anomalies in the integrated data by detecting one or more outliers by analyzing a plurality of features.

20. The computer-implemented method of claim 19, the analyzing of the plurality of features comprising analyzing the plurality of features through a machine learning algorithm comprising either a k-nearest neighbors (KNN) machine learning algorithm, or an isolation forest machine learning algorithm.

21. A computer-implemented method for use in improving data quality, the method comprising:

receiving, with one or more second processors from one or more first processors, a plurality of units, the plurality of units comprising a connect unit, an integrate unit, a detect unit, and a correct unit;

with the received connect unit and at the one or more second processors, receiving data from one or more data sources;

with the received integrate unit and at the one or more second processors: (i) receiving the data from the connect unit, (ii) preparing the data for analysis by integrating the data by placing the data in a common file format;

with the received detect unit and at the one or more second processors: (i) receiving the integrated data from the integrate unit, and (ii) detecting anomalies in the integrated data; and with the received correct unit and at the one or more second processors: (i) determining a recommended correction to a record of the integrated data to eliminate an anomaly detected by the detect unit in the integrated data received from the integrate unit, and (ii) simultaneously training, based on input received from a user: (a) a recommendation machine learning algorithm to generate recommendations for corrections to anomalies, and (b) a rule correction machine learning algorithm;

the plurality of units received by the one or more second processors further comprising a repair unit, and a visualize unit, and the method further comprising:

with the correct unit and at the one or more second processors: (i) determining, by inputting data of a record into the trained recommendation machine learning algorithm: (a) the recommended correction to the record of the integrated data to eliminate an anomaly detected by the detect unit, and (b) a confidence level that the recommendation is correct, and (ii) generating correction rules by inputting records into the trained rule correction machine learning algorithm;

with the repair unit and at the one or more second processors: (i) controlling a display to present the recommendation determined by the correct unit, (ii) receiving an input indicating that the presented recommendation is correct, and (iii) in response to the indication that the presented recommendation is correct, changing the record according to the presented recommendation; and with the visualize unit and at the one or more second processors: (i) generating a list of correction rules from correction rules generated by the detect unit, (ii) controlling a display to display the list of rules, (iii) receiving input specifying a rule from the list of rules, and (iv) in response to receiving the input specifying the rule, displaying a list of anomalies corresponding to the specified rule.

\* \* \* \* \*